April 7, 1942.                P. J. BOHAN                2,279,087
                          ANTI-AIRCRAFT GUN
                        Filed Oct. 10, 1939           7 Sheets-Sheet 1

Inventor
Patrick J. Bohan
By Clarence A. O'Brien
and Hyman Berman
Attorneys

April 7, 1942.　　　P. J. BOHAN　　　2,279,087
ANTI-AIRCRAFT GUN
Filed Oct. 10, 1939　　　7 Sheets-Sheet 2

Inventor
Patrick J. Bohan
By Clarence A. O'Brien
and Hyman Berman
Attorneys

April 7, 1942.　　　P. J. BOHAN　　　2,279,087
ANTI-AIRCRAFT GUN
Filed Oct. 10, 1939　　　7 Sheets-Sheet 4

Inventor
Patrick J. Bohan
By Clarence A. O'Brien
and Hyman Berman
Attorneys

April 7, 1942.                P. J. BOHAN                 2,279,087
                            ANTI-AIRCRAFT GUN
                           Filed Oct. 10, 1939              7 Sheets—Sheet 6

Inventor
Patrick J. Bohan
By Clarence A. O'Brien
and Hyman Berman
Attorneys

April 7, 1942.                P. J. BOHAN                2,279,087
                           ANTI-AIRCRAFT GUN
                       Filed Oct. 10, 1939            7 Sheets-Sheet 7

Inventor
Patrick J. Bohan

By Clarence A. O'Brien
and Hyman Berman
Attorneys

Patented Apr. 7, 1942

2,279,087

UNITED STATES PATENT OFFICE 2,279,087

ANTIAIRCRAFT GUN

Patrick J. Bohan, Sailor Springs, Ill., assignor of one-fourth to Glenn R. Easley, Clay City, and one-fourth to R. L. Koyner, Sailor Springs, Ill.

Application October 10, 1939, Serial No. 298,863

4 Claims. (Cl. 89—11)

This invention relates to an anti-aircraft gun, the general object of the invention being to provide the gun with a plurality of barrels with means for simultaneously firing shells in the barrels so that a plurality of projectiles can be thrown at aircraft thus making it easy for a gunner to easily strike an aircraft for even if some of the projectiles miss others are likely to hit the aircraft.

Another object of the invention is to provide means for rendering it difficult for one not familiar with the gun for operating it so that if the gun falls into the hands of an enemy the enemy will have difficulty in using the gun against the former users of the gun.

Another object of the invention is to provide means for locking the breech and the breech housing when the parts are in firing position with means for simultaneously ejecting the empty shells as the breech is moved rearwardly, this movement also setting the firing mechanism.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 27 is a view showing a modified form of the means for pushing the ejector carrying disk forwardly.

Figures 1, 4, 22:
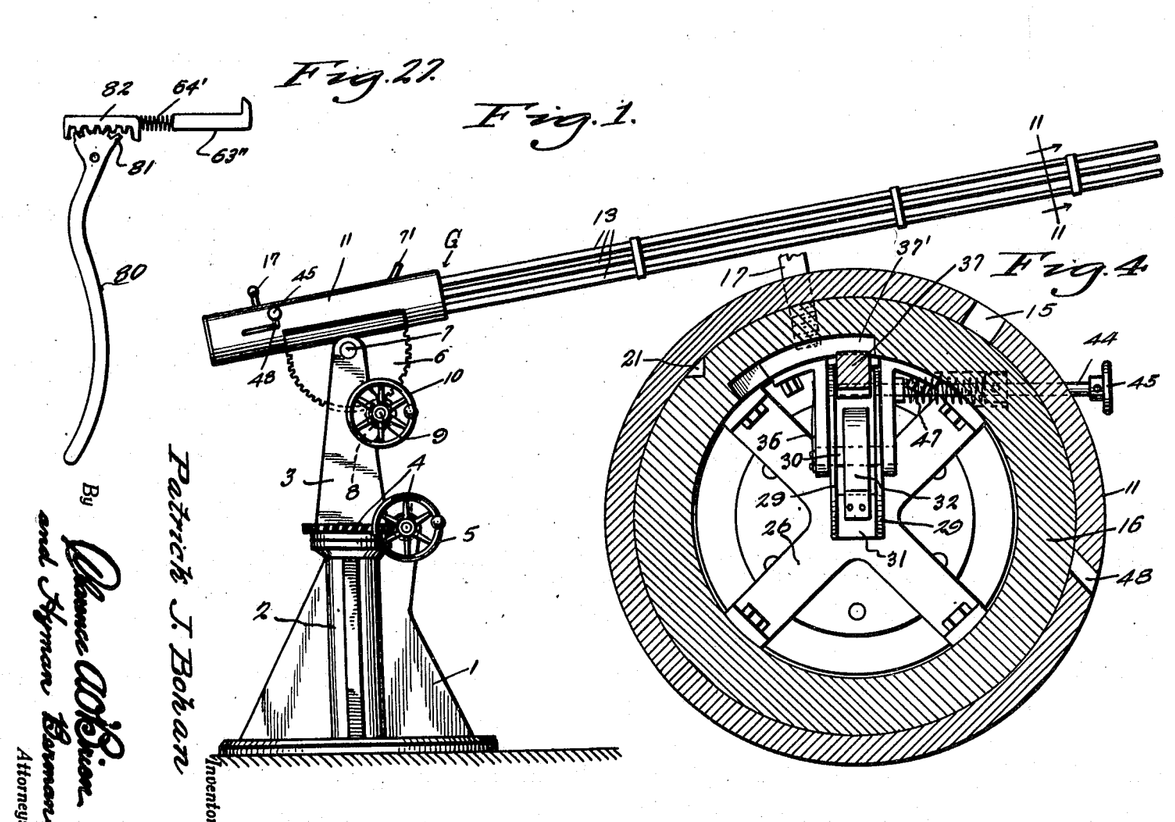
Figure 1 is a side elevational view of the improved gun.
Figure 4 is a section on the line 4—4 of Figure 3.
Figure 22 is a view of the plunger which is engaged by said block-like member.

Referring to Figure 1 the numeral 1 indicates a stationary base for the gun which, of course, may be mounted on a stationary foundation or on a vehicle so that the gun can be transported from place to place or it may be mounted on a ship. This base is formed with a vertically arranged tubular part 2 which receives the shank (not shown) of an upright 3. This upright 3 can be turned on the base 1 by means of the gear mechanism shown generally at 4 and which is turned by a hand wheel 5. The gun is shown generally at G and has a toothed segment 6 depending therefrom and this segment is pivoted to the upper end of the upright 3 as shown at 7 and a gear 8 meshes with the teeth of the segment 6 and the shaft 9 of this gear is turned by a hand wheel 10. This arrangement permits the gun to be moved on a horizontal axis as well as partly rotated on a vertical axis, thus enabling the gun to be pointed at any object in the sky such as an aeroplane.

Figure 3:
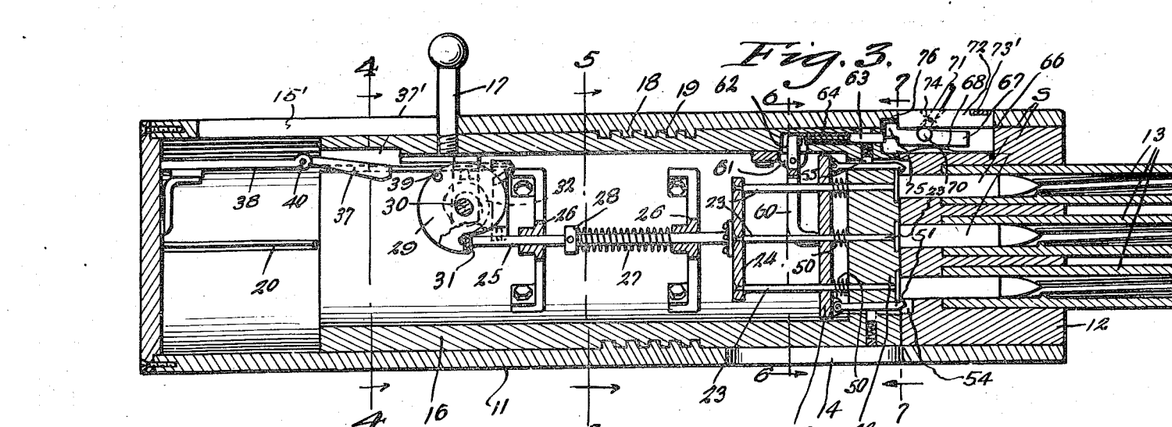
Figure 3 is a section on the line 3—3 of Figure 2.
Figure 5:
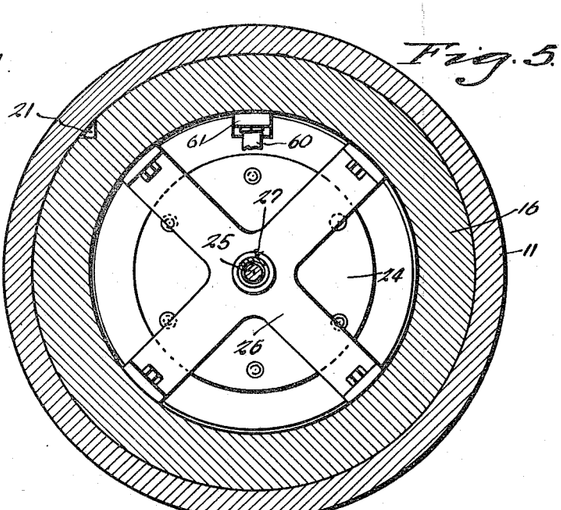
Figure 5 is a section on the line 5—5 of Figure 3.

The gun includes an elongated cylindrical housing 11 having a bored member 12 in its front end into the bores of which a plurality of barrels 13 have their rear ends suitably mounted and held, the rear portions of the bores in the member 12 forming continuation of the bores of the barrels for receiving the shells S as shown in Figure 3. In rear of this member 12 the lower part of the housing 11 is formed with an opening 14 through which the ejected shells drop and said housing adjacent its rear end is formed with an L-shaped slot 15, the arm 15' of which extends longitudinally and the second arm 15" extends transversely. While the drawings show this slot in the upper part of the housing it is to be understood that it can be placed wherever desired.

Figure 2:
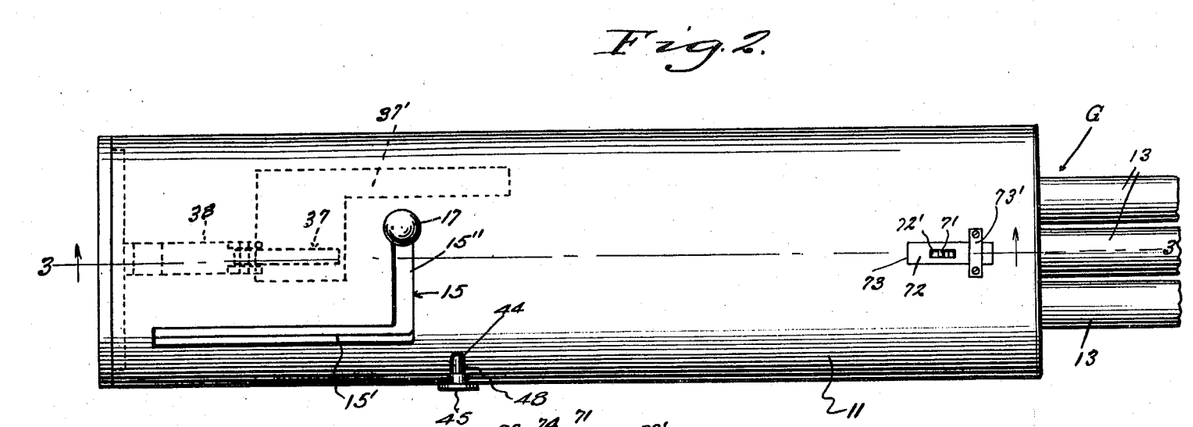
Figure 2 is a top plan view of the rear portion thereof.

A cylindrical breech member 16 is slidably arranged in the housing and a handle 17 is connected with this breech and passes through the slot 15. The housing intermediate its ends is formed with the mutilated threads or ribs 18, see Figure 8, and the breech member is formed with similar threads or ribs 19 on its exterior circumference and these ribs are so formed that when the handle 17 is in the position shown in Figure 2 the ribs or threads 18 and 19 will interengage and thus lock the breech member in its forward position as shown in Figure 3. However, when the handle 17 is turned to the junction of the two arms of the slot then the ribs 18 and 19 are out of engagement and then the breech member can be moved rearwardly by moving the handle 17 rearwardly through the arm 15' of the slot. The breech member 16 is formed with the longitudinally extending grooves 16', providing spaces for the teeth 18 of the housing 11, so that the breech member can be moved longitudinally after its teeth 19 are moved out of engagement with the teeth 18 of the housing by a partial rotary movement of the breech member.

In order to prevent turning movement of the breech member as it is being moved rearwardly I provide a rib 20 in the housing at the rear thereof which enters a groove 21 in the rear of the breech member as the same slides rearwardly. The front end of the breech member is closed by a closure member 22 and this member is provided with a plurality of holes, one for each barrel, for the passage of the firing pins 23, said pins being attached to a disk 24 attached to the front end of a rod 25 which is supported for sliding movement in the spiders 26 carried by the breech member. A spring 27 encircles a part of the rod 25 and has one end bearing against one of the spiders and its other end bearing against a collar 28 fastened to the rod, this spring tending to move the parts in a direction to move the pins out of firing position.

Figure 13:
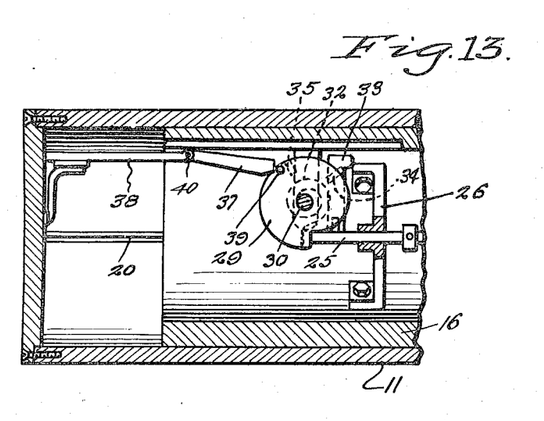
Figure 13 is a fragmentary longitudinal sectional view through the rear part of the gun showing the hammer mechanism and the parts associated therewith.
Figure 14:
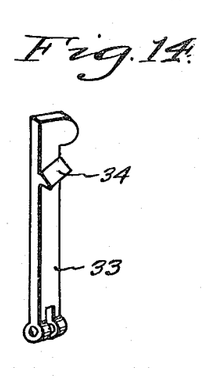
Figure 14 is a view of the latch member for holding the hammer member in set position.
Figure 15:
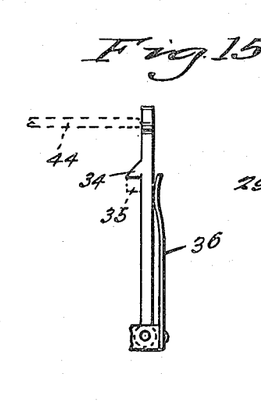
Figure 15 is an edge view of the latch member and showing its spring and showing in dotted lines how the trigger plunger engages the same.
Figure 16:
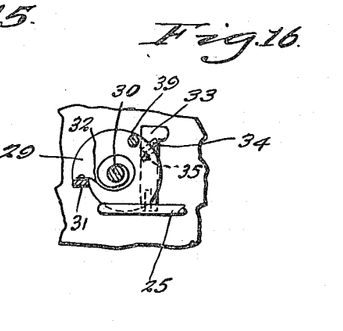
Figure 16 is a fragmentary vertical sectional view showing the hammer mechanism.
Figures 23, 24, 25:
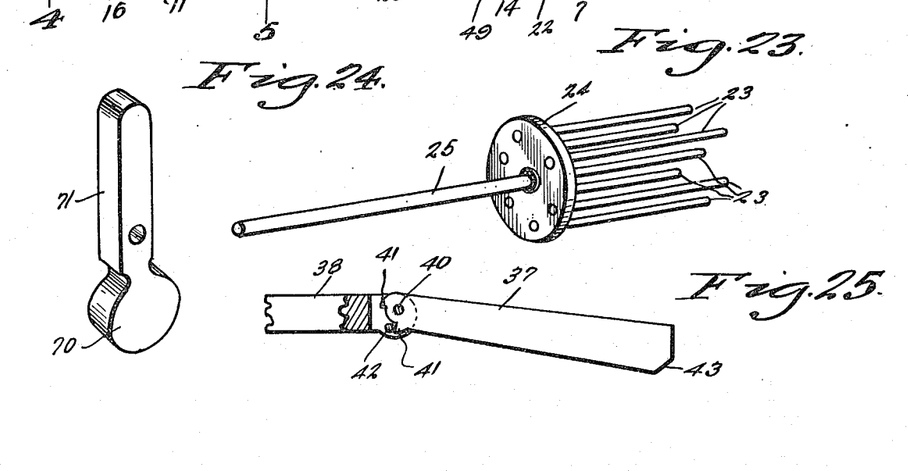
Figure 23 is a view of the firing pins.
Figure 24 is a view of the control lever which is connected with the block-like member.
Figure 25 is a view partly in section showing the resetting lever and its supporting member.

The hammer mechanism includes a pair of disk-like members 29 mounted on a shaft 30 which extends across the upper portion of the breech member adjacent the rear thereof and these disks are connected together by a cross piece 31 which has its ends engaging shoulder forming projections on the disks and one end of a spring 32 is fastened to the cross piece and its other end to the shaft as shown more particularly in Figure 16, the parts being so arranged that the spring tends to move the disk assembly in a counter-clockwise direction to cause the cross piece 31 to strike the rear end of the rod 25 and thus move the rod and the firing pins forwardly to strike and fire the shells or cartridges S, it being understood that this spring 32 has greater strength than the spring 27. A latch lever 33, see Figures 14 and 15, is pivoted at its lower end to a bracket 30' in the breech member, which bracket supports the shaft 30 and the lever at its upper end has a lip forming projection 34 thereon which is beveled as shown in Figures 14 and 15 and this projection is adapted to be engaged by a similar projection 35 on one of the disks 29, when the disks are moved forwardly or in a clockwise direction. Thus as the disk assembly is moved forwardly in a clockwise direction the projection 35 will first engage the projection 34 on lever 33 and then move the lever outwardly against the action of its spring 36 so that the projection 35 will pass by the projection 34 and then the two projections will interlock and the hammer mechanism is held in set position as shown in Figure 16. The hammer mechanism is moved to the position shown in Figure 16 by a bar-like member 37 supported for limited rocking movement on a forwardly extending bracket 38 attached to the rear end of the housing 11 as shown in Figure 13. Thus as the breech member is moved rearwardly a pin 39 on the disk assembly will strike the forward end of this member 37 which causes the hammer mechanism to rotate against the action of the spring 32 until the projection 35 interlocks the projection 34 on the lever 33 and then the parts are in the set position shown in Figure 16. This member 37 is pivoted to the forward end of the bracket 38 as shown at 40 in Figures 3 and 25. The member 37 is limited in its up and down movement by the shoulders 41 formed on its pivoted end which engage a pin 42 carried by the member 38. The forward end of this member 37 is beveled as at 43 so that after it has moved the hammer mechanism to setting position by engagement with the pin 39 it will ride off the pin and then when the breech member is returned to forward position the member 37 will simply ride over the pin without having any effect on the hammer mechanism. The trigger means for releasing the hammer mechanism includes a rod 44 having a finger piece 45 at its outer end with the rod passing through a bracket 46 in the breech member 16 and the rod being so supported that when pressed upon its inner end will engage the upper end of the lever 33 moving the same outwardly against the action of the spring 36 and releasing the lip projection 34 from the projection 35 so that the spring 32 of the hammer mechanism can turn the same in an anti-clockwise direction and thus cause the member 31 to strike the rod 25 with sufficient force to cause the firing pins to strike the cartridges and explode the same. A spring 47 normally holds the trigger rod 44 in an outward position.

A slot 48 of substantially L-shape in the housing 11 permits rotary and sliding movement of the breech member in the housing without interference from the trigger rod 44.

Figures 6, 7, 21, 22:
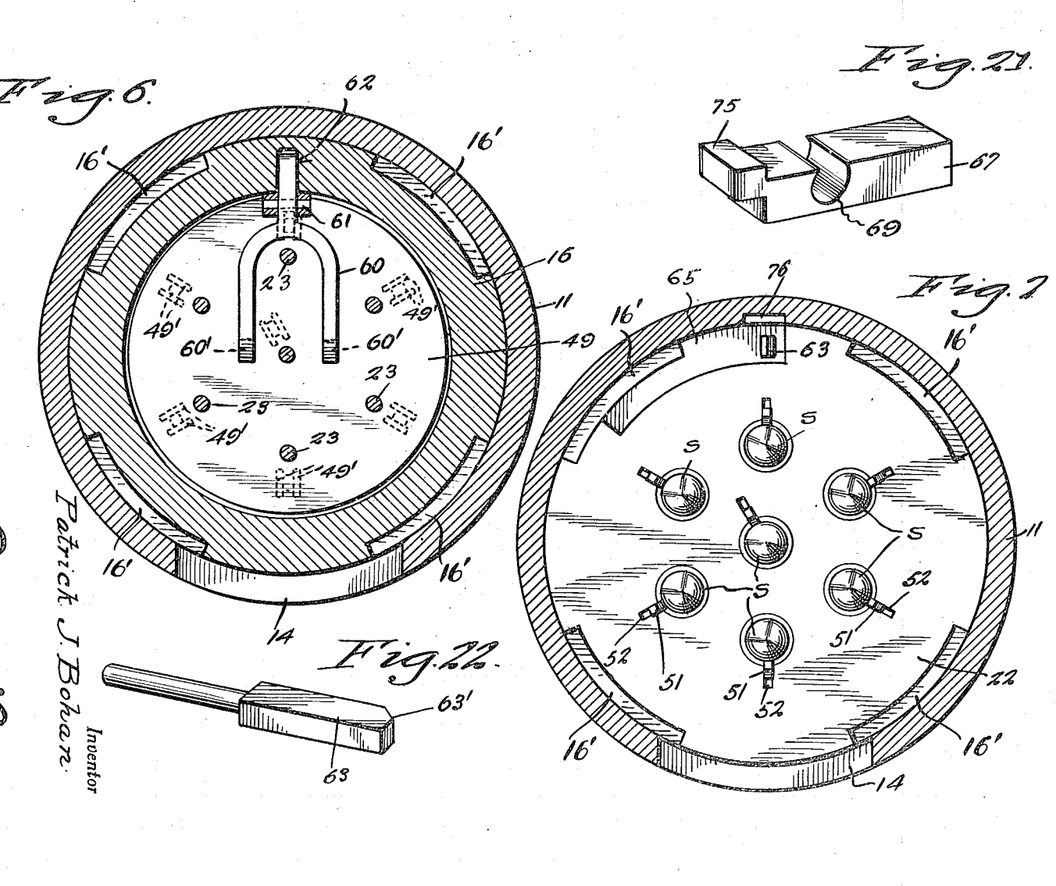
Figure 6 is a section on the line 6—6 of Figure 3.
Figure 7 is a section on the line 7—7 of Figure 3.
Figure 21 is a view of the block member actuated by the lever for controlling the ejector mechanism.
Figures 8, 9, 19, 20:
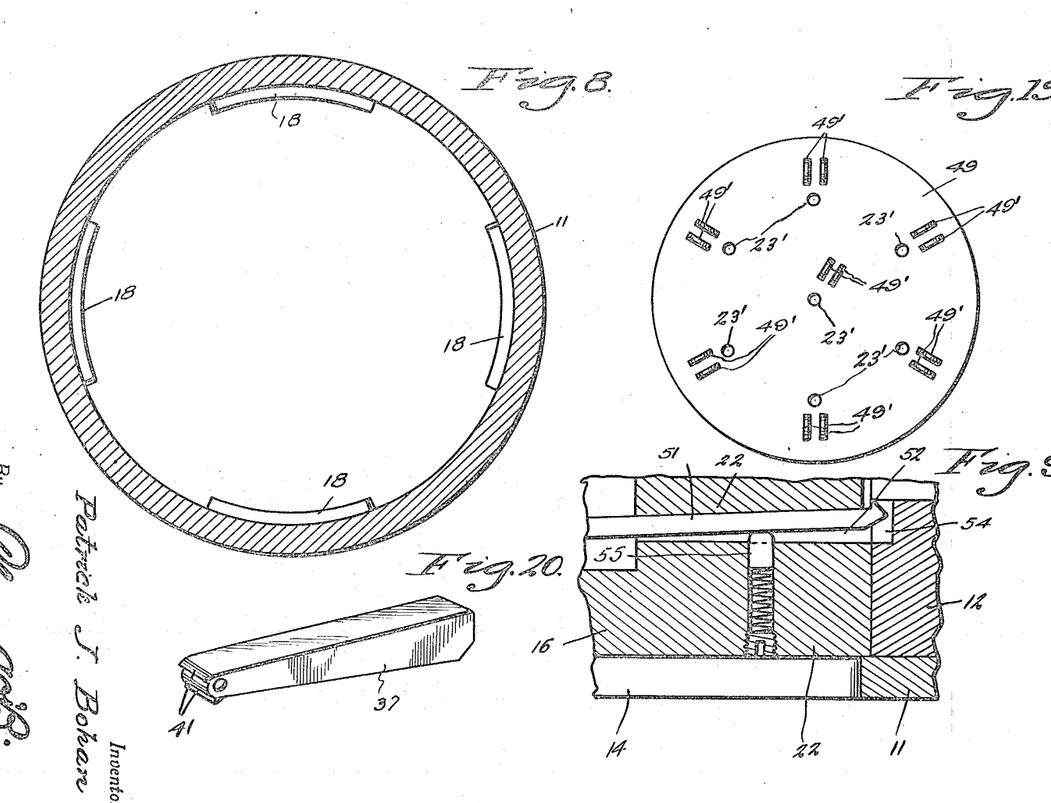
Figure 8 is a transverse sectional view through the breech housing and showing the locking ribs therein.
Figure 9 is a detailed longitudinal sectional view showing an ejector hook and the associated parts.
Figure 19 is a face view of the disk which carries the extractor hooks.
Figure 20 is a view of the lever which resets the hammer mechanism.
Figure 18:
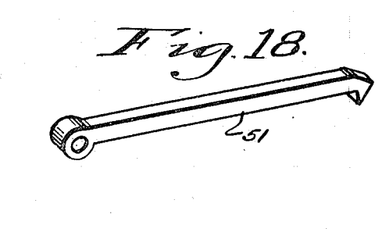
Figure 18 is a view of an extractor hook.

A disk 49 is slidably arranged on the firing pins 23 and has holes therein through which the pins pass and springs 50 encircle said pins and tend to press the disk 49 away from the front end member 22 of the breech member and said disk 49 has pivoted thereto a plurality of extractor hooks 51, see Figure 18. These hooks pass through holes 52 in the member 22 and have their beaks adapted to engage the rims of the cartridges or shells S, as shown more particularly in Figures 3, 7 and 9, the front face of the member 22 having small recesses therein for receiving the heads or flanged ends of the shells or cartridges and the rear face of the closure member 12 for the front end of the housing is formed with the notches 54 for receiving the front ends of the extractor hooks when the same are in projected position as shown in Figure 9. Spring plungers 55 are carried by the member 22 and engage the extractor hooks and act to hold them in ejecting position or with their beaks in engagement with portions of the flanges of the shells or cartridges, the holes 52 being large enough to permit lateral or swinging movement of the extractor hooks as shown in Figure 9.

The springs 50 tend to hold the disk 49 in a position with the extractor hooks out of the notches 54 and therefore out of engagement with the flanged ends of the shells.

The extractor hooks 51 are pivoted to the disk or plate 49 by means of the pairs of ears 49' on the disk or plate as shown in Figure 19 and the holes in this plate 49 through which the firing pins 23 pass are shown at 23' in Figure 19.

Figures 10, 26:
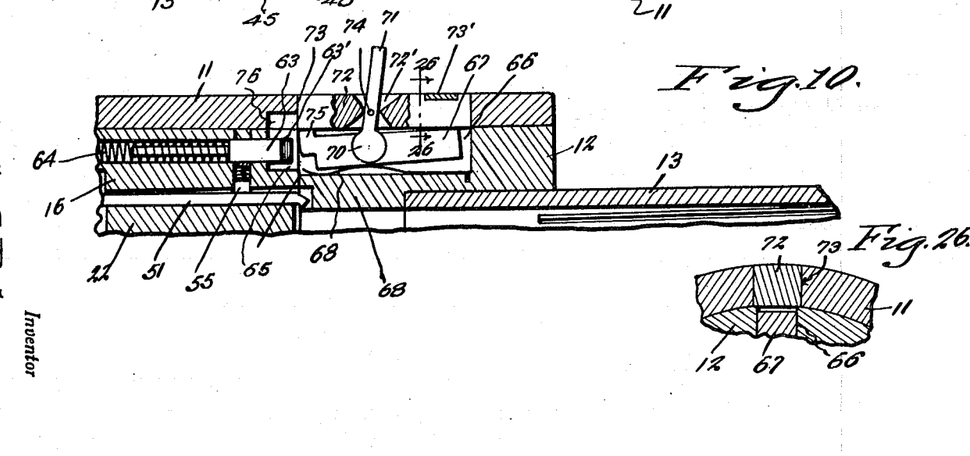
Figure 10 is a detailed longitudinal sectional view showing parts of the extractor mechanism with the lever for controlling the same.
Figure 26 is a detail sectional view on the line 26—26 of Figure 10.
Figures 11, 17:
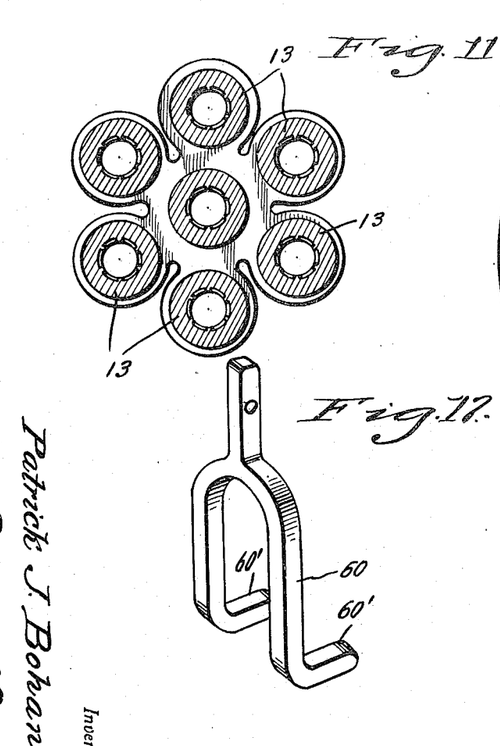
Figure 11 is a section on the line 11—11 of Figure 1.
Figure 17 is a view of the yoke member forming part of the extractor mechanism.
Figure 12:
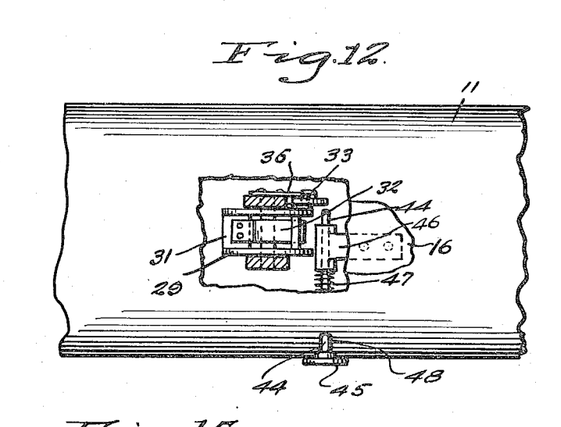
Figure 12 is a fragmentary top plan view with parts broken away of the breech housing and showing in plan and section the hammer or firing mechanism.

A yoke 60 is pivoted to a bracket 61 in the front end of the breech member 16 and the limbs of the yoke are bent at right angles as shown at 60', see Figure 17, for engagement with the plate or disk 49 and the shank of the yoke extends into an internal notch 62 formed in the breech member and a plunger 63 operates in an opening or small bores in the breech member which opening opens out into the notch and the spring 64 of the plunger bears against the end of the shank of the yoke as shown in Figure 3. The plunger 63 is shown in detail in Figure 22 and is formed with a body part and a shank part, the shank part receiving the spring 64 and the front end of the body part is formed with a bevel 63'. The front end of the plunger 63 extends into an elongated circumferentially extending groove 65 formed in the front end of the breech member or the end part 22 thereof, this groove being of arcuate shape and an elongated longitudinally extending notch 66 in the member 12 of the breech housing has its rear end in communication with this groove. This notch 66 receives a block-like member 67 shown in detail in Figure 21 and normally pressed outwardly by the leaf spring 68 and said member 57 is provided with a substantially circular recess 69 therein for receiving the rounded end 70 of a lever 71, see Figure 24. A second block 72 removably fits in an opening 73 formed in the top part of the front end of the housing 11 and this opening 73 is placed over the recess 66 in the part 12, and as shown in Figure 26 this opening 73 is wider than the opening 66 so that the block 72 can rest on portions of the member 12. This block 72 is removably held in the opening 73 by the strap-like member 73' which is detachably connected with the housing 11 by screws or in any other suitable manner. The block 72 has an opening 72' therein which tapers from its center downwardly and upwardly as shown and the lever 71 passes through this opening 72' and is pivoted therein by a pin 74 as shown more clearly in Figure 10. By removing this member 73' the block 72 and the block 67 can be removed from the gun and, of course, as these blocks are removed the lever 71 is also removed.

The rear end of the block 67 is formed with an enlargement or nose 75 which has a part projecting above the top face of said block so that when the lever 71 is moved rearwardly the rounded end of the lever will move the block 67 downwardly and then forwardly to place this nose 75 under a portion of the block 72 and then the parts will be in the position shown in Figure 10. By moving the lever 71 forwardly it will move the block 67 rearwardly so that the nose 75 will enter the groove 65 of the front end 22 of the breech member and also an internal recess 76 in the housing 11 which opens out into the groove 65.

When the lever 71 is moved forwardly, as shown in Figure 3, the lock 67 will be moved rearwardly so that its nose 75 will project into the groove 65 at the front end of the breech member and also into the internal recess 76. Then when the breech member is given a partly turning motion by moving the handle 17 from the position shown in Figure 2 to that shown in Figure 3 where said handle 17 is at the forward end of the longitudinally extending part or arm 15' of the slot 15, this movement of the breech member will cause the beveled end 63' of the plunger 63 to engage the nose 75 of the block 67 so that the plunger is moved rearwardly so that its rear end will engage the shank of the yoke 60 so as to cause the yoke to press forwardly the plate 49 against the action of the springs 50 and this forward movement of the plate 49 will move the extractors forwardly into the notches 54 in the rear face of the part 12 so that the beaks of the extractors can engage the rims of the cartridges or shells. Then when the lever 17 is moved rearwardly to retract the breech member the shells are pulled from the barrels and thrown through the opening 14.

When the lever 71 is moved rearwardly the block 67 is first moved downwardly so as to disengage its nose 75 from the rear end of block 72 and then block 67 moves forwardly to the position shown in Figure 10 so that its nose will be out of engagement with the plunger 63.

To load the gun the handle 17 is moved to the right through the part 15" of the slot 15 which, of course, turns the breech member to disengage its locking threads 19 from the threads or ribs 18 of the housing and then the handle is moved rearwardly through the part 15' of the slot 15 to move the breech member to its rearmost position and this causes the member 37 to move the hammer mechanism 29 into locking position or in reset or cocked position. It also uncovers the opening 14 so that shells can be placed in the rear ends of the barrels 13. Either before the breech member is moved rearwardly or before the breech member is moved forwardly the lever 71 is moved rearwardly so as to move the block 67 out of engagement with the plunger 63 and then the breech member is moved forwardly by moving the handle 17 forwardly through the part 15' of the slot and then to the left through the part 15" of the slot. This closes the breech member against the rear face of the part 12 of the housing and also presses the member 22 against the rear ends of the cartridges in the barrels and also locks the threads 19 of the breech member with the threads 18 of the housing to prevent longitudinal movement of the breech member. Then the lever 71 is moved forwardly so as to cause the block 67 to have its nose 75 enter the groove 65 at that end remote from the end occupied by plunger 63. Then the gun is fired by pressure upon the trigger members 44 and 45 which releases the catch member 33 from the hammer mechanism thus permitting the spring of the hammer mechanism to rotate the same in an anti-clockwise direction so that the hammer mechanism throws the firing pins forwardly against the cartridges and thus the cartridges are fired. Then the handle 17 is moved to the right through the part 15" of the slot and when it reaches the beginning of the part 15' of the slot the beveled end of plunger 63 will engage the nose 75 of block 67 so that the plunger will be moved rearwardly, thus applying pressure to the shank of the yoke 60 which will move the limbs of the yoke against the plate 49 to cause the plate to project the ejectors into the notches or slots 54 and the plungers 55 will cause the beaks of the ejectors to engage the rims of the cartridges so that when the breech member is moved rearwardly by movement of the handle 17 rearwardly through the part 15' of the slot 15, the cartridges will be extracted from the barrels and thrown through the opening 14.

As before stated rearward movement of the breech member will reset the hammer mechanism or recock the gun and as it starts to move rearwardly the groove in the breech member will engage the rib 20 so as to prevent relative rotary movement between the breech member and the housing.

Instead of using a yoke of the form shown at 60 and a plunger as shown at 63 said yoke can be made as shown at 80 in Figure 27 with its shank provided with a tooth quadrant 81 for engaging the rack bar 82 which is slidably arranged in a groove in the breech member and engaged by a spring 64' when the plunger 63" is pressed rearwardly by the block 67. In this case the pressure of the spring 64' will move the rack bar 82 which, in turn, causes the yoke member 80 to press upon the extractor carrying plate 49 to move the same forwardly to place the extractors in engagement with the cartridges, as before explained.

As will be seen the block 67 must be moved rearwardly before the extractor means will operate to eject the cartridges and thus one must be familiar with this use of the lever 71 before he can operate the gun. Also, by removing the blocks 73 and 67 with the lever it will be impossible for one to use the gun so that if a soldier has to leave the gun during a retreat he can, by removing these blocks, make it impossible, or practically so, for the enemy to use the gun. Thus these blocks with the lever act as safety means and prevent the use of the gun unless the blocks are in place.

A substantially L-shaped recess 37' is formed in the rear end of the internal part of the breech member so that the breech member can be moved without interference from the part of the bracket 38 and the member 37.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A gun of the class described comprising a housing, a plurality of barrels having their rear ends connected with the front end of the housing and said housing having an opening therein for permitting cartridges to be placed in the barrels and the empty cartridges extracted therefrom, a cylindrical breech member slidably arranged in the housing, mutilated interlocking threads carried by the housing and the breech member, said housing having an L-shaped slot therein, a handle member connected with the breech member and passing through the slot for moving the breech member in a partial rotary movement and in a longitudinal movement, the partial rotary movement moving the threads of the breech member into and out of engagement with the threads of the housing, a plate, a plurality of firing pins carried by the plate for firing the cartridges, a rod connected with the plate slidably supported in the breech member, a rotary hammer mechanism spring actuated for moving the rod forwardly to cause the pins carried by the plate to fire the cartridges, means for moving the hammer mechanism into cocking position when the breech member is moved rearwardly, a trigger member for releasing the hammer mechanism, a plate, extractor hooks carried by the plate for engaging rims of the cartridges for ejecting the cartridges after they are fired, said extractor carrying plate being movably arranged on the firing pins, a yoke engaging the ejector plate, a spring plunger for placing the yoke under pressure when the plunger is moved rearwardly, a manually operated member carried by the housing for moving the plunger to apply pressure to the yoke when said member is in one position and said member releasing the pressure when in another position, said member when in pressure applying position engaging the plunger when the breech member has been partly rotated to release its threads from the threads of the housing.

2. A gun of the class described comprising a mount, a member supported therein for movement about a vertical axis, a gun including a housing connected with the member for movement about a horizontal axis, manually operated means for moving the member about its vertical axis, manually operated means for moving the gun about its horizontal axis, a plurality of barrels having their rear ends connected with the front end of the housing and in communication with said housing, said housing having an opening therein for permitting cartridges to be placed in the rear ends of the barrels, said housing having an L-shaped slot therein, a breech member of cylindrical form slidably and rotatably arranged in the housing, a handle connected with the breech member and passing through the slot, a rib and groove formation carried by the housing and breech member for preventing rotary movement of the breech member when the same is being moved longitudinally, means for locking the breech member against longitudinal movement when the handle member has moved the breech member into the end of the lateral arm of the slot, firing mechanism carried by the breech member including a hammer mechanism, a trigger member for releasing the hammer mechanism, means for cocking the hammer mechanism when the breech member is moved rearwardly and combined safety mechanism and extractor mechanism including a hand lever extending from the housing, said means including a plate, extractor hooks carried by the plate, a yoke pivoted in the breech member and engaging the plate, a spring plunger for exerting pressure on the yoke which in turn exerts pressure on the plate, a block-like member movably arranged in the front end of the housing, a lever passing through a slot in the housing for moving the block-like member and the front end of the breech member having an arcuate groove therein into which the front end of the plunger projects and the rear end of the block-like member engaging the plunger when said block-like member has been moved rearwardly by the lever and the breech member has been moved to a position where the interlocking means are disengaged and the breech member is in a position to be moved rearwardly.

3. In a gun of the class described, a housing, a plurality of barrels connected with one end of the housing, a breech member slidably and rotatably arranged in the housing, a handle for moving the breech member in a partial rotary movement and a longitudinal movement, means for locking the breech member to the housing when the breech member is in a forward position and rotated in one direction, firing mechanism carried by the breech member, hammer mechanism carried by the breech member, means for cocking the hammer mechanism when the breech member is moved rearwardly, manually operated means for releasing the hammer mechanism, extractor mechanism, spring means for normally holding said ejector mechanism in inoperative position, means including a plunger for moving the ejector mechanism into operative position, a lever operated member removably supported by the housing for actuating the plunger, a lever for moving said lever operated member into operative and inoperative position.

4. In a gun of the class described, a housing, a plurality of barrels connected with one end of the housing, a breech member slidably and rotatably arranged in the housing, a handle for moving the breech member in a partial rotary movement and a longitudinal movement, means for locking the breech member to the housing when the breech member is in a forward position and rotated in one direction, firing mechanism carried by the breech member, hammer mechanism carried by the breech member, means for cocking the hammer mechanism when the breech member is moved rearwardly, manually operated means for releasing the hammer mechanism, extractor mechanism, spring means for normally holding said extractor mechanism in inoperative position, means including a plunger for moving the extractor mechanism into operative position, a lever operated member removably supported by the housing for actuating the plunger, a lever for moving said lever operated member into operative and inoperative position, and means for preventing operation of the extractor mechanism by the lever operated member until the breech has been rotated to a position where the breech is ready to be moved rearwardly.

PATRICK J. BOHAN.